(12) United States Patent
Strahan

(10) Patent No.: US 8,584,517 B2
(45) Date of Patent: Nov. 19, 2013

(54) LOAD BASED WHEEL POSITION DETERMINATION

(75) Inventor: Samuel Strahan, Antrim (IE)

(73) Assignee: Schrader Electronics Ltd, Northern Ireland (GB)

( * ) Notice: Subject to any disclaimer, the term of this patent is extended or adjusted under 35 U.S.C. 154(b) by 342 days.

(21) Appl. No.: 13/156,460

(22) Filed: Jun. 9, 2011

(65) Prior Publication Data

US 2011/0308310 A1 Dec. 22, 2011

Related U.S. Application Data

(60) Provisional application No. 61/398,112, filed on Jun. 21, 2010.

(51) Int. Cl.
*G01M 17/02* (2006.01)
*B60C 23/02* (2006.01)

(52) U.S. Cl.
USPC ............. 73/146.5; 73/146; 340/442; 340/447

(58) Field of Classification Search
None
See application file for complete search history.

(56) References Cited

U.S. PATENT DOCUMENTS

| | | | |
|---|---|---|---|
| 6,204,758 B1 | 3/2001 | Wacker | |
| 7,010,968 B2 * | 3/2006 | Stewart et al. | 73/146 |
| 7,023,334 B2 * | 4/2006 | Fischer et al. | 340/444 |
| 7,268,678 B2 * | 9/2007 | Chakam et al. | 340/442 |
| 7,271,711 B2 * | 9/2007 | Daiss et al. | 340/447 |
| 7,337,659 B2 * | 3/2008 | Naidu et al. | 73/146 |
| 7,362,218 B2 * | 4/2008 | McCall et al. | 340/447 |
| 7,385,494 B2 * | 6/2008 | Mori et al. | 340/442 |
| 7,427,915 B2 * | 9/2008 | Ogawa et al. | 340/442 |
| 7,834,747 B2 * | 11/2010 | Achterholt | 340/447 |
| 2005/0179530 A1 | 8/2005 | Stewart | |

FOREIGN PATENT DOCUMENTS

WO 2006100577 A1 9/2006

* cited by examiner

*Primary Examiner* — Lisa Caputo
*Assistant Examiner* — Jermaine Jenkins
(74) *Attorney, Agent, or Firm* — Holland & Hart LLP

(57) ABSTRACT

A method carried out in a wheel unit of a tire pressure monitoring system comprises detecting, using a controller in the wheel unit, increases and decreases in loading of a tire on a wheel associated with the wheel unit during acceleration and deceleration. Front/rear position of the wheel unit on a vehicle mounting the tire pressure monitoring system is determined, using the controller in the wheel unit, based on the loading and unloading of the tire and wheel during acceleration and deceleration. Rotation direction of the wheel in the wheel unit is determined and the controller in the wheel unit determines left/right position of the wheel unit on the vehicle based on the rotation direction of the wheel. An indication of the front/rear and left/right position of the wheel on the vehicle and an identification unique to the transmitting wheel unit are transmitted.

17 Claims, 3 Drawing Sheets

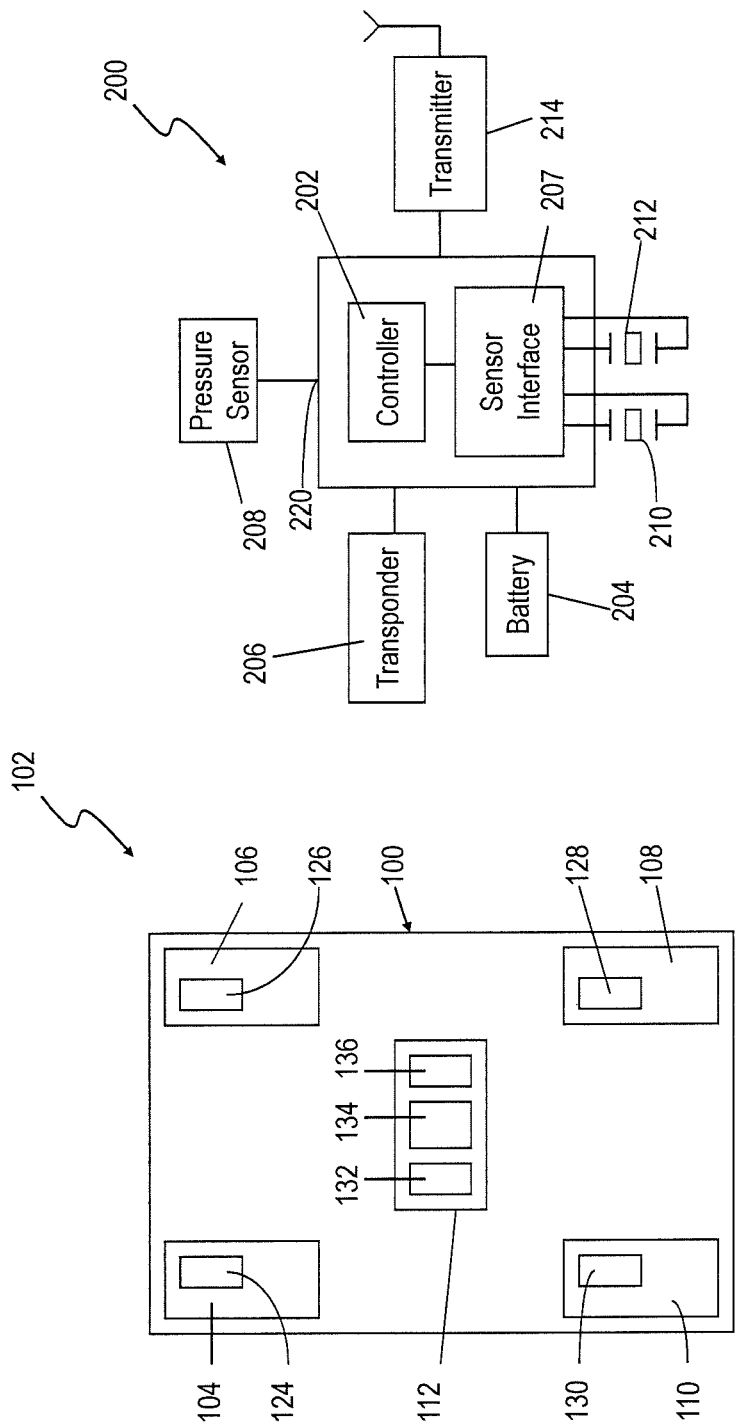

LOAD BASED WHEEL POSITION DETERMINATION

BACKGROUND

This disclosure relates generally to Tire Pressure Monitoring (TPM), more particularly to locating TPM wheel units with respect to a particular vehicle, and specifically to determining a wheel position of a tire pressure monitoring wheel unit on a vehicle, within the wheel unit, using loading information measured at the tire pressure monitoring wheel unit.

TPM systems may have been developed to monitor characteristics such as tire pressure and/or tire temperature of a vehicle and to report the characteristics to a receiver at a central monitoring station using radio transmissions. A monitor may be located adjacent each tire and periodically takes a measurement of the tire characteristics. The monitor may then transmits the results of the measurement in a radio frequency transmission to the central monitoring station which produces an alarm or a display in response to the measurement.

One issue in such systems has been the need to program the location of the transmitters at the vehicle's central receiver. To be fully useful, the tire characteristic data is preferably associated with the tire which originated the measurement when presenting a display or alarm. Each monitor typically can transmit unit identification information with the measurement. The tire monitor is preferably activated to produce this information and the information is then conveyed to the central receiver and associated with the position of the tire.

In direct TPM applications the sensor unit in the wheel has no way of making the determination if the wheel has been moved on the vehicle. Some systems have a method of transmitting right/left information which a least can alert the receiver as to which side of the vehicle the sensor is on.

Some of these existing solutions to provide such position information include Radio Frequency Detector (RFD) based systems. These systems employ one or more RFD's to determine which wheel a transmission originates from using received signal strength or other signal attributes. Problematically, such RFD-based systems require cables running from a central receiver to each RFD, typically four RFDs, each located in a wheel arch.

Front rear determination has sometimes been carried out by analyzing signal strength data at the receiver. Received Signal Strength Indicator (RSSI) based systems determine front and rear wheel positions by comparing received signal strength from each of the wheel units. However, this solution relies on the receiver being 'biased' to the front or rear of the vehicle in order to create a difference in received signal strength. Such systems are typically prone to RF power variations and can have problems with attaining a sufficient RF margin between front and rear.

LF (Low Frequency) triggers, typically coils in each wheel arch (or elsewhere nearby) may be employed to activate the wheel unit, which responds in a manner which indicates which LF trigger activated it, thus allowing the receiver to make the wheel position determination in some systems. These systems have similar problems to those encountered by RFD-based systems.

Many other TPM autolocation systems are typically power hungry in that the wheel units in such systems transmit more messages or data than typical, and/or include more than the typical components, straining battery resources within the wheel unit.

SUMMARY

The present disclosure is directed to systems and methods which allow identification of the location on a vehicle of a TPM transmitter. In particular the present systems and methods provide location indication of a TPM wheel unit on a vehicle based at least in part on loading information, such as pressure changes or tire footprint changes, measured in the wheel unit, and rotation direction information detected in the wheel unit. Thus the wheel units may transmit both left/right information, and front/rear information. This allows the TPM wheel unit to independently inform the receiver where it is on the vehicle, therefore allowing the receiver to be placed anywhere on the vehicle. Alternatively, the location of a TPM sensor may be determined based at least in part on the information received from it.

Various embodiments of methods carried out in a wheel unit of a TPM system for determining location of the wheel unit on a vehicle might include using the wheel unit to detect increases and decreases in loading of a tire on a wheel associated with the wheel unit during acceleration and deceleration. Such detection of increases and decreases in loading might be accomplished by measuring a pressure in the tire and sending the measured pressure to a controller in the wheel unit. These measurements may be triggered by acceleration or deceleration of the vehicle, which may be detected using one or more accelerometers or shock sensors. Alternatively or additionally, increases and decreases in loading might be detected by detecting changes in a footprint of the tire. Loading increases on front tires of the vehicle and decreases on rear tires during deceleration; and the loading decreases on front tires of the vehicle and increases on rear tires during the acceleration. The controller in the wheel unit may be used to determine front/rear position of the wheel unit on a vehicle mounting the tire pressure monitoring system, based on the loading and unloading of the tire and wheel during acceleration and deceleration. Rotation direction of the wheel in the wheel unit is preferably detected, such as by detecting acceleration in the wheel using one or more accelerometers or shock sensors. The controller in the wheel unit my further be used to determine left/right position of the wheel unit on the vehicle based on the rotation direction of the wheel. Finally, an indication of the front/rear and left/right position of the wheel unit on the vehicle and an identification unique to the transmitting wheel unit is transmitted by the wheel unit, such as to a central receiver of the tire TPM system.

Thus embodiments of a tire monitoring wheel unit might include a pressure sensor, one or more acceleration sensors and a wheel unit controller. The controller might have one module for receiving signals from the one or more acceleration sensors and determining a left/right location of the wheel unit on a vehicle mounting the wheel unit from the signals from the one or more acceleration sensors. This, or another module, might detect acceleration and deceleration of the vehicle, such as by employing the same or other acceleration signals from the acceleration sensors. The acceleration sensor(s) may be accelerometer(s) or shock sensor(s). The controller may also include a pressure module for receiving pressure signals from the pressure sensor and determining a front/rear position on the vehicle from increases and decreases in the pressure signals during acceleration and deceleration of the vehicle. A transmitter transmits an indication of a position of the wheel unit on the vehicle and an identification unique to the wheel unit, such as to a central receiver of a TPM system employing the wheel unit. In resulting embodiments of TPM systems including such a wheel unit a central controller receiving the transmissions from each of the wheel units may associate a transmitted wheel unit position and the accompanying identification, such that subsequent tire pressure measurements can be associated with a wheel position on the vehicle.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings:

FIG. 1 is a block diagram of an embodiment of a tire monitoring system (TMS) shown in conjunction with parts of a vehicle;

FIG. 2 is a block diagram of a wheel unit included in the TMS of FIG. 1;

DETAILED DESCRIPTION

Figure 3:
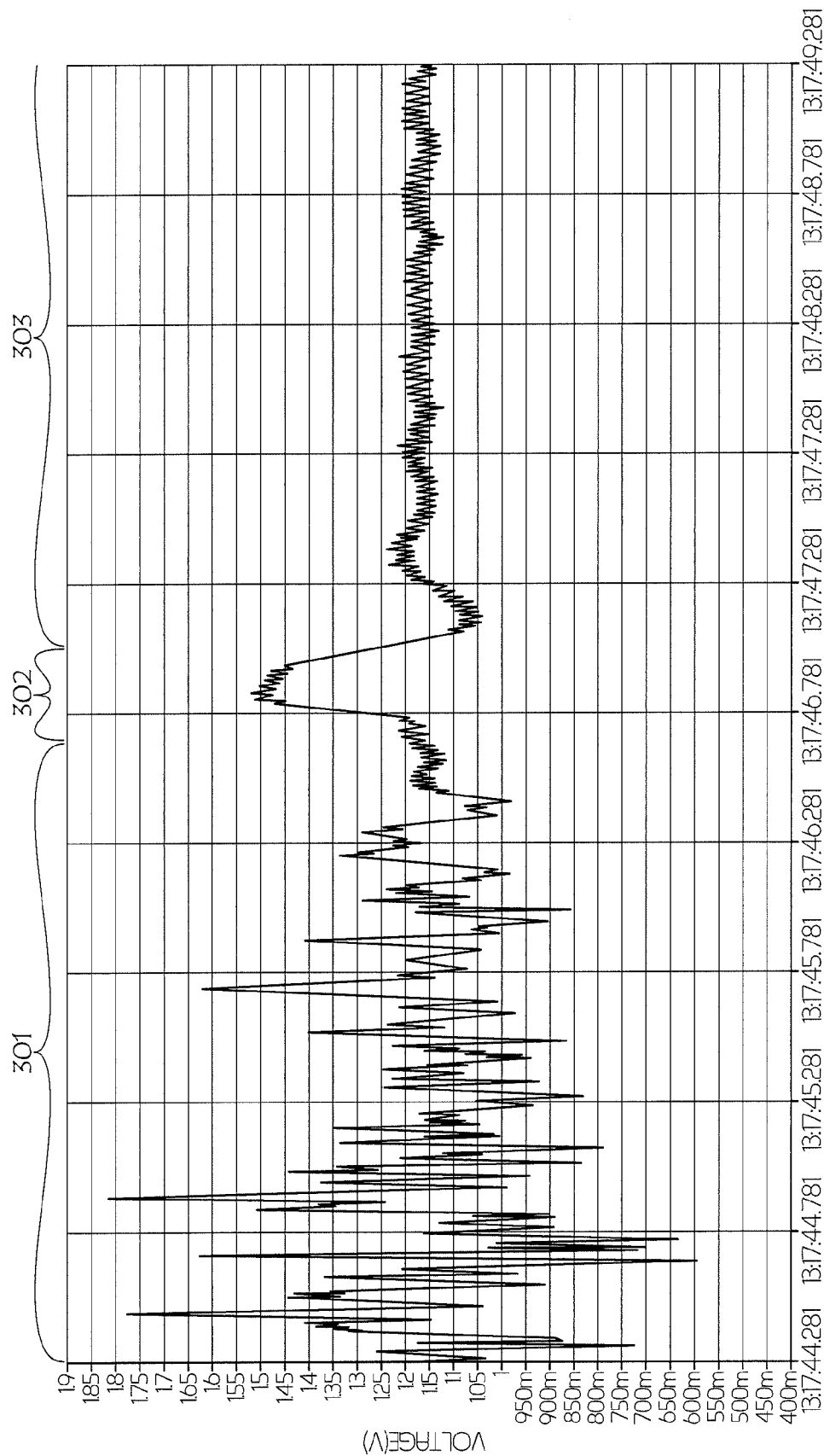
FIG. 3 is a graph of a signal of a front tire prior to, during and after braking.

Referring now to FIG. 1 of the drawings, there is shown, generally indicated as 102, a tire monitoring system (TMS) shown in situ on a vehicle 100. For reasons of clarity, only those portions of the vehicle 100 and TMS 102 that are helpful in understanding the present disclosure are shown.

The vehicle 100 includes wheels 104, 106, 108, 110, each wheel including a tire mounted on a rim. The TMS 102 includes a control unit 112 (such as an vehicle Engine Control Unit (ECU), or a Body Control Module (BCM)) and tire monitors 124, 126, 128, 130, typically generally referred to as sensors, transmitters, wheel units, and/or the like. The tire monitors 124, 126, 128, 130 measure tire characteristics and transmit corresponding tire data for reception and processing by the control unit 112. Typically, a respective tire monitor is associated with each wheel of the vehicle 100.

In some embodiments, the tire monitors are capable of measuring tire pressure and of transmitting data to the control unit 112, including data representing the measured tire pressure and usually also identification information uniquely identifying the respective tire monitor. Each of the tire monitors 124, 126, 128, 130 includes a suitably powered wireless transmitter, conveniently a battery powered radio frequency (RF) transmitter, and a pressure sensor for measuring the pressure of the gas (usually air) within the tire. In such embodiments, the system 102 may be referred to as a tire pressure monitoring system (TPMS).

Any suitable control unit may be used in the system 102. By way of example, in the illustrated embodiment, the control unit 112 includes a controller 132, a memory device 134 and a receiver 136 for receiving wireless transmissions from the tire monitors.

Referring now to FIG. 2, there is shown a block diagram of an embodiment of a tire monitor 200. The tire monitor 200 includes a controller 202, a power source such as a battery 204, a transponder coil 206, a pressure sensor 208, one or more piezoelectric motion sensors 210, 212, a wireless transmitter 214 and an antenna 216. In this illustration, the motion sensors 210, 212 each comprise a respective shock sensor of the type that produces an electrical signal in response to being subjected to changes in acceleration, the electrical signal being indicative of, typically proportional to, the experienced change in acceleration. Alternatively, the sensors 210, 212 may each comprise an accelerometer or a microelectromechanical systems (MEMS) sensor. The main difference between an accelerometer and a shock sensor is that the output signal from a shock sensor is related to a change of force applied to the shock sensor, whereas the output signal from an accelerometer is proportional to the absolute force applied.

In the illustrated embodiment, the pressure sensor 208 detects the pneumatic air pressure of the tire with which the tire monitor 200 is associated. In alternative embodiments, the pressure sensor 208 may be supplemented with a temperature sensor or other devices for detecting tire data. An indication of the tire data is provided by the controller 202 at an input 220. Controller 202 may be implemented by any suitable means, for example a microprocessor, microcontroller, an Application Specific Integrated Circuit (ASIC), or other suitable data processing device programmed to perform the functions described herein.

In accordance with various embodiments of the present systems and methods, a front/rear wheel unit location determination may be made by looking at signals from the pressure sensor. When a wheel is in rolling contact with a ground surface, the interaction of the wheel's tire and the ground surface generates vibrations, or noise, which causes relatively small fluctuations in the air pressure within the tire. Hence, the vibration or resonance of the tire generates a signal. In such cases, the signal may be said to comprise an acoustic signal or resonance, which may or may not be in an audible frequency range. Pressure sensor 208 detects this acoustic signal when it measures the air pressure in the tire. As a result, the output signal of the pressure sensor includes one or more signal components representing the acoustic signal. Detection and use of such signals for motion detection and the like are disclosed and discussed in commonly-owned U.S. Pat. No. 7,104,123, which is incorporated herein by reference. As discussed therein, the pressure sensor sampling circuit of sensor 200 might include an adjustable gain stage or the like, in order to allow high resolution pressure sampling.

Figure 4:
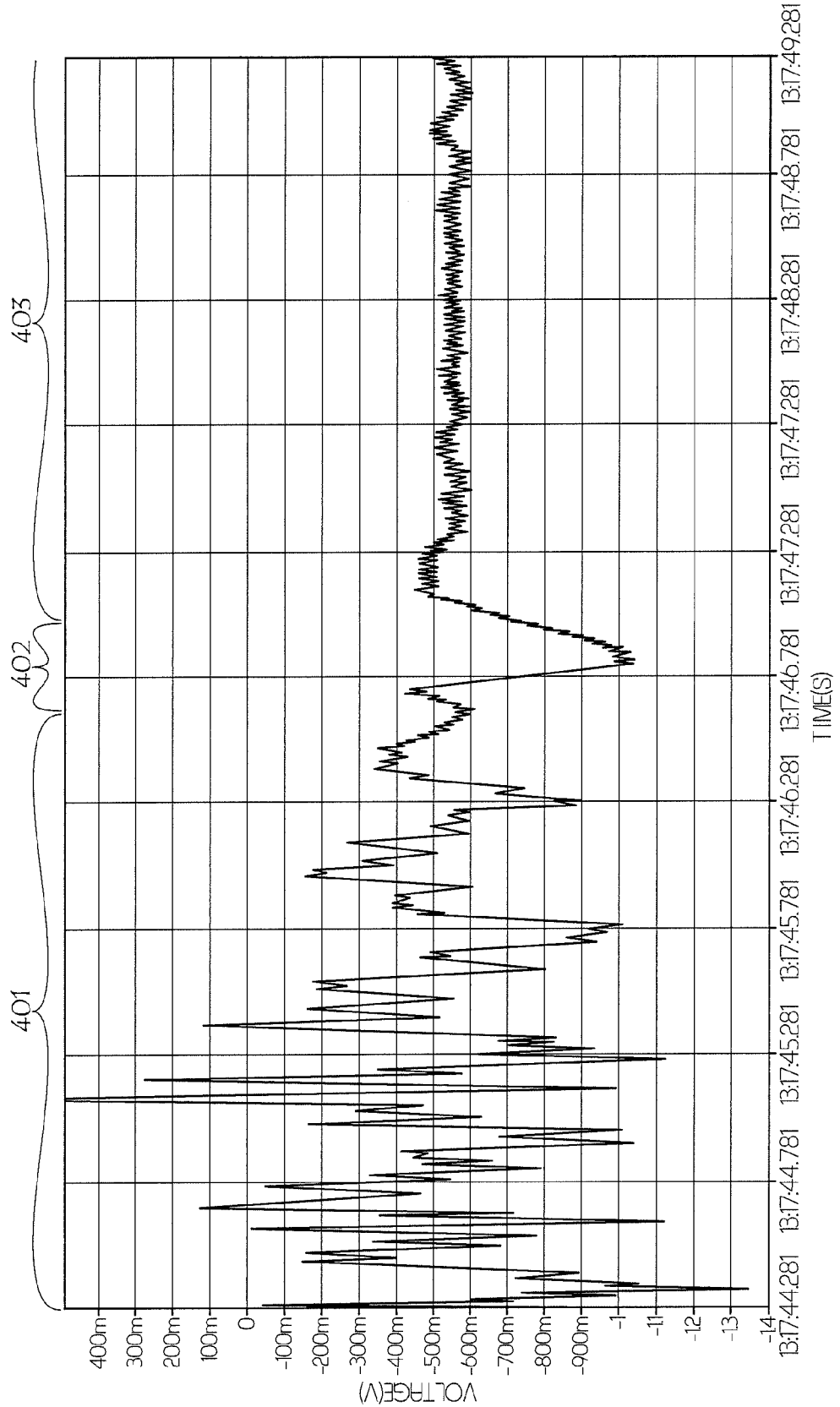
FIG. 4 is a graph of a signal of a rear tire prior to, during and after braking.

FIG. 3 is a graph of such an acoustic or other signal of a front wheel prior to (301), during (302) and after (303) braking. FIG. 4 is a graph of such an acoustic or other signal of a rear wheel prior to (401), during (402) and after (403) braking. As shown in FIG. 3, during deceleration the pressure in the front tires increase and the pressure in the rear tires decrease. When the vehicle is accelerating, the opposite happens, inertia causes the rear of the vehicle to experience a higher load and the front of the vehicle experiences a lighter load. These load changes on the front and the rear of the vehicle are manifested as additional small pressure changes in the tires. So, when the vehicle is accelerating the pressure in the front tires decreases slightly and the pressure in the rear tires increases slightly. In accordance with the present disclosure controller 202 analyzes these small pressure changes and makes a determination as to whether the wheel unit is on the front or rear of the vehicle. This information can then be transmitted along with the left/right information discussed below. This combination of left/right and front/rear information provides all the information necessary for the wheel unit to inform the receiver as to its location on vehicle 100.

A number of pressure sensor sampling strategies may be employed by the present systems and methods. In accordance with some embodiments, signals from accelerometric device (s) 210, 212 may be used to, in effect, trigger a pressure measure. Such acceleration signals can provide information that enables controller 202 to determine that the vehicle is accelerating or braking. This change of speed information could then be used to initiate an immediate pressure sample which could either be continuous or discrete in nature. Advantageously, this strategy calls for pressure sampling (for the purposes of wheel unit location determination) only when there has been suitable speed change detected by the controller, such as through the use of, but not exclusively, suitable tracking filter circuitry, thereby conserving battery power. In other embodiments, signal 220 from pressure sensor 208 may be frequently sampled, particularly at the start of a drive and then the sampling rate for the remainder of the drive may be adjusted, depending on the sampling success at the commencement of the drive. Controller 202 may include modules configured to accomplish various functionalities. These modules may include software, firmware, and/or hardware, or combinations thereof to accomplish the various functionalities described herein.

The present systems and methods may alternatively use other tire load information for a front/rear determination. For example, some TPM systems mount a wheel unit onto the inside of a tire, directly to the tire carcass, such as to the back side of the tire tread. This tire mounted technology has the potential to measure a footprint of the tire when it is in contact with the road. By analyzing the shape/size of the footprint a determination can be made regarding the vehicle load. Similar to as discussed above, i.e. acceleration causing larger load on rear of the vehicle, the footprint information can be used when the vehicle is accelerating and braking. This information could also be combined with left/right information to provide a location transmission to a receiver. Additional robustness could be added to such an embodiment by combining footprint information with pressure changes and correlating the information to provide more certainty to a location determination.

A shock sensor interface 207 is provided in the tire monitor 200 and is configured to provide the necessary control signals and detect the electrical signals from the shock sensors 210, 212. The shock sensors 210, 212 in one embodiment detect acceleration to produce an output in the form of an electrical charge output signal. The output signal is typically in the order of 1 mV/g. The shock sensor interface 207 receives the electrical output signal, which is analog in nature, amplifies and filters the signal to provide a corresponding processed output signal to the controller 202. The shock sensor interface 207 operates in response to control signals from the controller 202. Preferably, both shock sensors 210, 212 can share the same interface 207 via multiplexing.

During use, the controller 202, or a module therein, is able to determine, based on electrical signals produced by the shock sensors 210, 212 as the wheel rotates, at least one aspect of the tire monitor's location, for example whether it is on the left side or the right side of the vehicle. The shock sensors 210, 212 may serve as a motion switch or rotational sensor for the tire monitor 200. The shock sensors 210, 212 may in combination form a dual axis accelerometer, but preferably shock sensors 210 and 212 are orientated in such a manner as to provide an output showing a 90 degree phase change in the z plane of the wheel. The shock sensors 210, 212 are one example of a force sensor, displacement sensor, or rotation sensor. The shock sensors may also be referred to generically as piezoelectric rotation sensors. Other types of piezoelectric rotation sensors may be used in place of the shock sensors described herein. Hence, in the illustrated embodiment, the shock sensors 210, 212 are used both as a motion switch, to determine when the tire is moving, and to determine what side of the vehicle the tire is located on. The shock sensors 210, 212 are coupled with the controller 202.

In accordance with various embodiments of the present systems and methods a TPM wheel unit can determine if it is on the left or right hand side of the vehicle by comparing phase signals from such an accelerometric device, or other mechanism for determining rotation direction and or the like. These two signals are typically ninety degrees out of phase and depending on the side of the vehicle that the sensor is on, a first signal will either lead a second signal by ninety degrees or lag the second signal by ninety degrees. The TPM sensor preferably has the capability to transmit this left/right information in the data packet to the receiver.

Any number of methods may be used to provide the right/left and/or clockwise/counter-clockwise information. For example, commonly owned Wacker, U.S. Pat. No. 6,204,758 discloses a system to automatically determine wheel position for automotive remote tire monitoring system, which is incorporated herein by reference. Therein, it is taught that during different operating conditions, tires mounted on a vehicle experience acceleration which can be detected at a tire monitor. The polarity of the acceleration varies in accordance with the location of the tire monitor on the right or left side of the vehicle. The acceleration information can be used to determine position of the tire monitor and its associated wheel on the vehicle. In particular, Wacker teaches that tire monitors on opposing sides of the vehicle will experience oppositely directed tangential acceleration. In one example, the sign of the detected tangential acceleration will correspond to the side of the vehicle, with positive acceleration indicating location on the left side of the vehicle and negative acceleration indicating location on the right side of the vehicle.

However, preferably, systems and methods to provide the right/left and/or clockwise/counter-clockwise information such as disclosed in commonly owned Stewart, et al., U.S. Pat. No. 7,367,227, entitled Determination of Wheel Sensor Position Using Shock Sensors and a Wireless Solution are generally used in the present disclosure. Therein, first shock sensor 210 produces a first motion signal, second shock sensor 212 produces a second motion signal and controller 202 is coupled to the first shock sensor and the second shock sensor. A controller circuit is configured to determine right side-left side position information for the tire monitor based on a lag-lead relationship of the first motion signal and the second motion signal. For example, as a wheel rotates, two waveforms are produced by the shock sensors, which are out of phase by ninety degrees. Depending on the direction of rotation of the wheel, clockwise or counterclockwise, one axis will lead or lag the other axis. Shock sensors convert the change in acceleration they detect into signals such as voltage waveforms. These signals, including a first signal for acceleration on one axis and a second signal for acceleration on a second axis, can then be amplified, filtered and converted to digital data by the controller of the tire monitor. Position information about position of a tire including the tire monitor can then be determined based on the signal. A decision can subsequently be made as to whether the tire monitor is rotating in a clockwise or counterclockwise direction, based on the sampled signals from the shock sensors. The position information, such as right hand side positioning or left hand side positioning can be determined from the direction of rotation. In particular, the controller of the tire monitor can determine a lag/lead relationship of a first acceleration signal and a second acceleration. The controller determines whether the first signal leads or lags the second signal. This lag/lead information will indicate either clockwise or counterclockwise rotation for the wheel or tire associated with the tire monitor. Based on the clockwise or counterclockwise rotation information, and information that the vehicle is traveling forward rather than backing up, the controller can determine whether the tire monitor is on the right-hand side or the left-hand side of the vehicle. For directional rotation, the disclosed method and apparatus analyze the alternating +1 g/−1 g component.

Signal verification circuitry, and/or a signal verification algorithm may be used in sensor 200 in addition to possible use of a tracking filter, or the like, in order to quantify the rate of change of vehicle speed. This information can then be used to make a determination of vehicle speed, make a determination of rate of change of vehicle speed, reject spurious signal which could potentially cause erroneous results, and the like. Such a Tracking Filter Apparatus for Wheel Monitoring Systems is disclosed in U.K. Basic Patent Application Number 0916369.2, filed Sep. 18, 2009, which is incorporated herein by reference. Such a tracking filter apparatus tracks a signal that has a varying main frequency and preferably has an adjustable filter and a filter controller arranged to measure the amplitude of the filtered signal and to compare amplitude against a reference value. The filter controller preferably adjusts the cut off frequency of the filter if the measured amplitude differs from the reference value by an amount that exceeds a threshold value. Preferably, the filter controller adjusts the cut off frequency such that the main frequency lies within a "roll off" region of the filter's frequency response. Such a tracking filter may be used to track signals that are produced by the aforementioned shock sensors in a wheel unit of the present disclosure to provide one or more filtered shock sensor signals from each wheel unit.

Transmitter 214 transmits an indication of the position of the wheel unit on the vehicle and an identification unique to the wheel unit, such as to central receiver 136 of TPM system 100. Central control unit 112, such as through use of central controller 132 and memory devices 134, preferably associates a transmitted wheel unit position and the accompanying identification. As a result, subsequent tire pressure measurement transmissions, which may or may not include wheel position information, but which will include the unique wheel unit identification, can be associated with a wheel position on the vehicle.

Additionally, or alternatively cornering information may be used to help determine front/rear position. For example, it is known that during cornering vehicle load shifts from one side of the vehicle to the other depending on cornering direction. For example, during a left hand turn the right hand side of the vehicle will experience a higher load which will result in a small pressure increase in the wheels on the right hand side of the vehicle. In accordance with the present systems and methods wheel unit 200 could collect information such as pressure changes, acceleration information and braking information. This data can then be transmitted to receiver 136. If the receiver has access to the vehicle bus which can provide cornering information, then the receiver can correlate cornering information from the TPM sensor with information from the vehicle bus. This method would allow use of fewer accelerometric devices in sensor 200, which reduces cost since cornering information is used in this embodiment for left/right determination.

In many cases it is desirable, or required, for a TPM system to provide information to the receiver to tell the receiver where on a vehicle a wheel unit is located. This is particularly desirable in vehicles with "split placards" i.e. in vehicles where the manufacture's recommended tire pressure is different in the front and rear. The present systems and methods allow wheel unit location to be carried out independently, with the wheel unit itself, without placing any constraints on receiver location.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method carried out in a wheel unit of a tire pressure monitoring system, comprising:
  detecting, based at least in part on parameters sensed at the wheel unit, increases and decreases in loading of a tire on a wheel associated with the wheel unit during acceleration and deceleration;
  determining, based at least in part on parameters sensed at the wheel unit, front/rear position of said wheel unit on a vehicle mounting said tire pressure monitoring system based on said increases and decreases in loading of said tire and wheel during acceleration and deceleration;
  detecting rotation direction of said wheel generally at said wheel unit;
  determining, based at least in part on parameters sensed at the wheel unit, left/right position of said wheel unit on said vehicle based at least in part on said rotation direction of said wheel; and
  transmitting an indication of the front/rear and left/right position of the wheel on the vehicle and an identification unique to the transmitting wheel unit.

2. The method of claim 1, wherein:
  said loading increases on front tires of said vehicle and said loading decreases on rear tires during deceleration; and
  said loading decreases on front tires of said vehicle and said loading increases on rear tires during said acceleration.

3. The method of claim 1, wherein said detecting increases and decreases in loading further comprises:
  measuring a pressure in said tire; and
  sending the measured pressure to a controller in the wheel unit.

4. The method of claim 3, wherein said measuring is triggered by acceleration or deceleration of said vehicle.

5. The method of claim 4, comprising detecting said acceleration or deceleration using one or more accelerometers.

6. The method of claim 4, comprising detecting said acceleration or deceleration using one or more shock sensors.

7. The method of claim 1, wherein said detecting rotation direction of said wheel comprises detecting acceleration in said wheel.

8. The method of claim 7, wherein said acceleration is detected using one or more accelerometers.

9. The method of claim 7, wherein said acceleration is detected using one or more shock sensors.

10. The method of claim 1, wherein said detecting increases and decreases in loading further comprises detecting changes in a footprint of a said tire.

11. A tire monitoring wheel unit comprising:
a pressure sensor;
one or more acceleration sensors; and
a wheel unit controller, said controller comprising:
a module configured to receive signals from said one or more acceleration sensors and further configured to determine a left/right location of said wheel unit on a vehicle mounting said wheel unit based at least in part on said signals from said one or more acceleration sensors, and further configured to detect acceleration and deceleration of said vehicle; and
a pressure module configured to receive pressure signals from said pressure sensor and further capable of determining a front/rear position on said vehicle based at least in part on increases and decreases in said pressure signals based on acceleration and deceleration of said vehicle.

12. The wheel unit of claim 11, further comprising a transmitter transmitting an indication of a position of said wheel unit on said vehicle and an identification unique to said wheel unit.

13. The wheel unit of claim 11, further comprising a transmitter transmitting an indication of said left/right position and said front/rear position of said wheel unit.

14. The wheel unit of claim 13, wherein said transmitter also transmits an identification unique to said wheel unit with said left/right position and said front/rear position of said wheel unit.

15. The wheel unit of claim 11, wherein said one or more acceleration sensors comprise one or more accelerometers.

16. The wheel unit of claim 11, wherein said one or more acceleration sensors comprise one or more shock sensors.

17. A tire monitoring system for a vehicle, comprising:
a tire monitoring wheel unit disposed in each wheel of said vehicle, each of said wheel units comprising:
a pressure sensor;
one or more acceleration sensors; and
a wheel unit controller, said controller comprising:
a module configured to receive signals from said one or more acceleration sensors and determine a left/right location of said wheel unit on a vehicle mounting said wheel unit, based at least in part on said signals from said one or more acceleration sensors, and further configured to detect acceleration and deceleration of said vehicle; and
a pressure module configured to receive pressure signals from said pressure sensor and determine a front/rear position on said vehicle from increases and decreases in said pressure signals based on acceleration and deceleration of said vehicle; and
a transmitter configured to transmit an indication of a position of said wheel unit relative to said vehicle and an identification unique to said wheel unit, and further configured to transmit tire pressure measurements with said identification unique to said wheel unit;
a central controller configured to receive the transmissions from each of the wheel units and associate a transmitted wheel unit position and identification, such that said tire pressure measurements can be associated with a wheel position on said vehicle.

* * * * *